United States Patent
Young

(10) Patent No.: US 11,759,379 B2
(45) Date of Patent: Sep. 19, 2023

(54) CONVEYANCE FOR SURMOUNTING OBSTACLES

(71) Applicant: ORBILIFT PTY LTD, Hornsby (AU)

(72) Inventor: Victor Young, Hornsby (AU)

(73) Assignee: ORBILIFT PTY LTD, Hornsby (AU)

( * ) Notice: Subject to any disclaimer, the term of this patent is extended or adjusted under 35 U.S.C. 154(b) by 210 days.

(21) Appl. No.: 16/757,582

(22) PCT Filed: Sep. 28, 2018

(86) PCT No.: PCT/AU2018/051065
§ 371 (c)(1),
(2) Date: Apr. 20, 2020

(87) PCT Pub. No.: WO2019/090385
PCT Pub. Date: May 16, 2019

(65) Prior Publication Data
US 2020/0276066 A1    Sep. 3, 2020

(30) Foreign Application Priority Data
Nov. 10, 2017   (AU) ................................ 2017904562

(51) Int. Cl.
*A61G 5/06*   (2006.01)
*A61G 5/02*   (2006.01)
(Continued)

(52) U.S. Cl.
CPC ............ *A61G 5/061* (2013.01); *A61G 5/022* (2013.01); *A61G 5/04* (2013.01); *A61G 5/1059* (2013.01); *A61G 2203/30* (2013.01)

(58) Field of Classification Search
CPC ...... A61G 5/061; A61G 5/022; A61G 5/1059; A61G 5/068
(Continued)

(56) References Cited

U.S. PATENT DOCUMENTS 3,227,465 A  *  1/1966  Massie ................. A61G 5/0816
                                                        188/85
3,241,848 A     3/1966  Flory
(Continued)

FOREIGN PATENT DOCUMENTS

CN      102794752 A  *  11/2012
CN      202948907 U  *   5/2013
(Continued)

OTHER PUBLICATIONS

JP-2012161456-A English Translation of Description Retrieved from Espacenet (Year: 2022).*
(Continued)

*Primary Examiner* — Kevin Hurley
*Assistant Examiner* — Hosam Shabara
(74) *Attorney, Agent, or Firm* — Finch & Maloney PLLC

(57) ABSTRACT

A conveyance for surmounting obstacles which includes a first ground engaging arrangement, and a second ground engaging arrangement, and the first and second ground engaging arrangements are operable to move in an alternating sequence of movements to enable the conveyance to surmount obstacles. The conveyance is statically balanced alternately by one then the other of the ground engaging arrangements throughout the sequence of movements. Each ground engaging arrangement includes a forwardly disposed portion and a rearwardly disposed portion which are spaced apart from one another. Each ground engaging arrangement further includes an obstacle accommodating region located between the forwardly disposed portion and the rearwardly disposed portion which can accommodate a portion of an obstacle being surmounted during use.

13 Claims, 13 Drawing Sheets

(51) Int. Cl.
A61G 5/04 (2013.01)
A61G 5/10 (2006.01)

(58) Field of Classification Search
USPC .................................................. 280/250.1
See application file for complete search history.

(56) References Cited

U.S. PATENT DOCUMENTS

| | | | | |
|---|---|---|---|---|
| 3,269,478 | A | * | 8/1966 | Joslyn .................... A61G 5/068 |
| | | | | 280/5.2 |
| 4,886,288 | A | * | 12/1989 | Dysarz ................ A61G 5/1097 |
| | | | | 280/43.17 |
| 5,701,965 | A | | 12/1997 | Kamen et al. |
| 9,168,940 | B1 | * | 10/2015 | Leszczak ................. A47D 1/00 |
| 9,726,268 | B1 | | 8/2017 | Krasowski ............. A61G 5/065 |
| 2015/0272793 | A1 | | 10/2015 | Lu |
| 2016/0067122 | A1 | * | 3/2016 | Aviv ....................... A61G 5/04 |
| | | | | 280/5.3 |
| 2016/0120715 | A1 | * | 5/2016 | Farmer ................ A61G 5/1059 |
| | | | | 280/648 |
| 2016/0251044 | A1 | * | 9/2016 | Klassen ............... B60F 3/0007 |
| | | | | 180/8.7 |
| 2018/0042797 | A1 | * | 2/2018 | Richter .................... A61G 5/04 |
| 2019/0193798 | A1 | * | 6/2019 | Lu .......................... A61G 5/061 |
| 2020/0375826 | A1 | * | 12/2020 | Chung .................... A61G 5/06 |
| 2021/0401639 | A1 | * | 12/2021 | Ozaki .................. A61G 5/1059 |

FOREIGN PATENT DOCUMENTS

| | | | | |
|---|---|---|---|---|
| CN | 105362005 | A | * | 3/2016 |
| CN | 105581877 | A | * | 5/2016 ............. A61G 5/061 |
| CN | 106074025 | A | * | 11/2016 ............. A61G 5/061 |
| CN | 106137577 | A | * | 11/2016 |
| CN | 107307949 | A | * | 11/2017 |
| CN | 108721006 | A | * | 11/2018 ............. A61G 5/061 |
| CN | 110693652 | A | * | 1/2020 |
| CN | 113044148 | A | * | 6/2021 ............. A61G 5/06 |
| DE | 19821451 | A1 | * | 11/1998 ............. A61G 5/046 |
| DE | 19821021 | A1 | * | 11/1999 ............. A61G 5/042 |
| DE | 102020001401 | A1 | * | 9/2021 |
| EP | 1118531 | A1 | * | 7/2001 ............. A61G 5/06 |
| JP | H021269 | A | * | 5/1990 |
| JP | 2012161456 | A | * | 8/2012 |
| JP | 2014234137 | A | * | 12/2014 |
| KR | 10-1188862 | B1 | | 10/2012 |
| KR | 101188862 | B1 | * | 10/2012 |
| WO | WO-2016059658 | A1 | * | 4/2016 ............. A61G 5/02 |
| WO | WO-2016110317 | A1 | * | 7/2016 |
| WO | WO-2021137710 | A1 | * | 7/2021 ............. A61G 5/06 |

OTHER PUBLICATIONS

KR-101188862 English Translation of Description Retrieved from Espacenet (Year: 2022).*
JP-H021269-A English Translation of Description Retrieved from Espacenet (Year: 2023).*
"Coordination Control of Bi-Articular Robotic Arm by Motor Drive with Planetary Gear" M. Shinohara IEEE Xplore—Aug. 2010 (Year: 2010).*
"Robotic Wheelchair from Chiba Tech Turns Wheels Into Legs and Climbs Over Steps", url: https://www.youtube.com/watch?v=t2SHKyq5yCU, Published on Oct. 14, 2012.
International Search Report Corresponding to PCT/AU2018/051065 dated Nov. 7, 2018.
Written Opinion Corresponding to PCT/AU2018/051065 dated Nov. 7, 2018.
International Preliminary Report on Patentability Corresponding to PCT/AU2018/051065 dated Jan. 22, 2019.

* cited by examiner

CONVEYANCE FOR SURMOUNTING OBSTACLES

TECHNICAL FIELD

The present invention relates to a conveyance for surmounting obstacles. Embodiments of the invention find a particular application in conveying persons up and down staircases. However, the invention is not limited to this application.

BACKGROUND TO THE INVENTION

Conveyances in the form of wheelchairs are known for conveying persons with limited mobility. A traditional wheelchair is a well-known arrangement and includes two larger rear wheels which the occupant can turn with their hands and two smaller front wheels which are able to swivel. It is also well known that traditional wheelchairs are unsuitable for ascending or descending staircases.

It has become common practice when designing a building or public space to provide access ramps alongside or in place of staircases to enable access by wheelchair users. Nonetheless, there remain scenarios where a person using a traditional wheelchair will be faced with a staircase or other obstacle that they cannot negotiate including for instance a staircase in a building with no elevator, a doorstep or a kerb.

It has been tried to provide alternative types of conveyances to enable persons with limited mobility to negotiate staircases. Previous attempts include conveyances which utilise a track based drive system. One or more tracks are provided with outer teeth. The tracks are driven, and the teeth press on the corners of steps to lift the conveyance up the stairs, or control descent down the stairs. However, such systems can cause significant damage to the corners of the stairs.

It has also been tried to provide conveyances with wheel clusters which include multiple wheels uniformly distributed in the same plane around a common centre. The cluster is driven to rotate to ascend or descend the staircase. However, a wheel cluster alone lacks stability when travelling on stairs. It needs an appendage to prevent tipping. Also, wheel cluster systems are optimally suited to stairs within a particular geometric range and are prone to damaging stairs outside that range.

There remains a need to provide improved conveyances for surmounting obstacles.

SUMMARY OF THE INVENTION

In a first aspect the present invention provides a conveyance for surmounting obstacles including: a first ground engaging arrangement; and a second ground engaging arrangement; the first and second ground engaging arrangements are operable to move in an alternating sequence of movements to enable the conveyance to surmount obstacles; the conveyance is statically balanced alternately by one then the other of the ground engaging arrangements throughout the sequence of movements; each ground engaging arrangement includes a forwardly disposed portion and a rearwardly disposed portion which are spaced apart from one another; and each ground engaging arrangement further includes an obstacle accommodating region located between the forwardly disposed portion and the rearwardly disposed portion which can accommodate a portion of an obstacle being surmounted in use.

The forwardly disposed portion and the rearwardly disposed portion of at least one of the ground engaging arrangements may be spaced apart from one another by being mounted at opposite ends of a beam.

The beam may be curved.

The first and second ground engaging arrangements may be joined to a rotating linkage which effects the alternating movement of the ground engaging arrangements.

The rotating linkage may include at least one epicyclic gear set.

The rotating linkage may include at least one epicyclic gearset which is associated with a chassis of the conveyance and another epicyclic gearset which is associated with at least one of the ground engaging arrangements.

The attitude of the ground engaging arrangements may be adjustable.

The ground engaging arrangements may include wheels.

At least some of the wheels may be driven wheels.

At least some of the wheels may be steerable wheels.

The conveyance may further include a seat to convey a person.

The conveyance may further include a pair of manually propelled wheels.

The manually propelled wheels may be removable.

The conveyance may be controllable to adopt a range of different operating heights.

The conveyance may be controllable to adopt a range of differently sized footprints.

The conveyance may be adjustable to tilt to compensate for travel on sloping ground.

The conveyance may be substantially symmetrical about a centre line parallel to the direction of travel of the conveyance.

BRIEF DESCRIPTION OF THE DRAWINGS

An embodiment of the present invention will now be described, by way of example only, with reference to the accompanying drawings, in which.

DETAILED DESCRIPTION OF EXAMPLE OF AN EMBODIMENT

Figure 1:
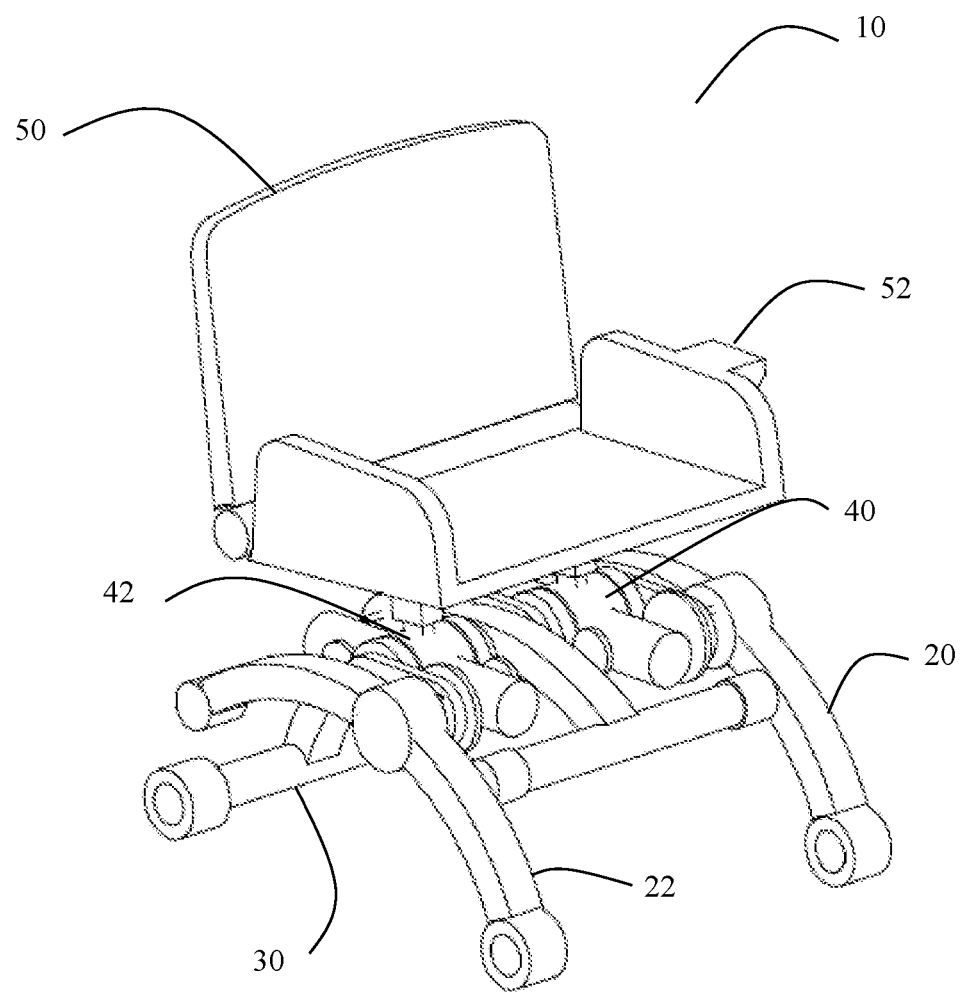
FIG. 1 is a perspective view of a motorised wheelchair.
Figure 2:
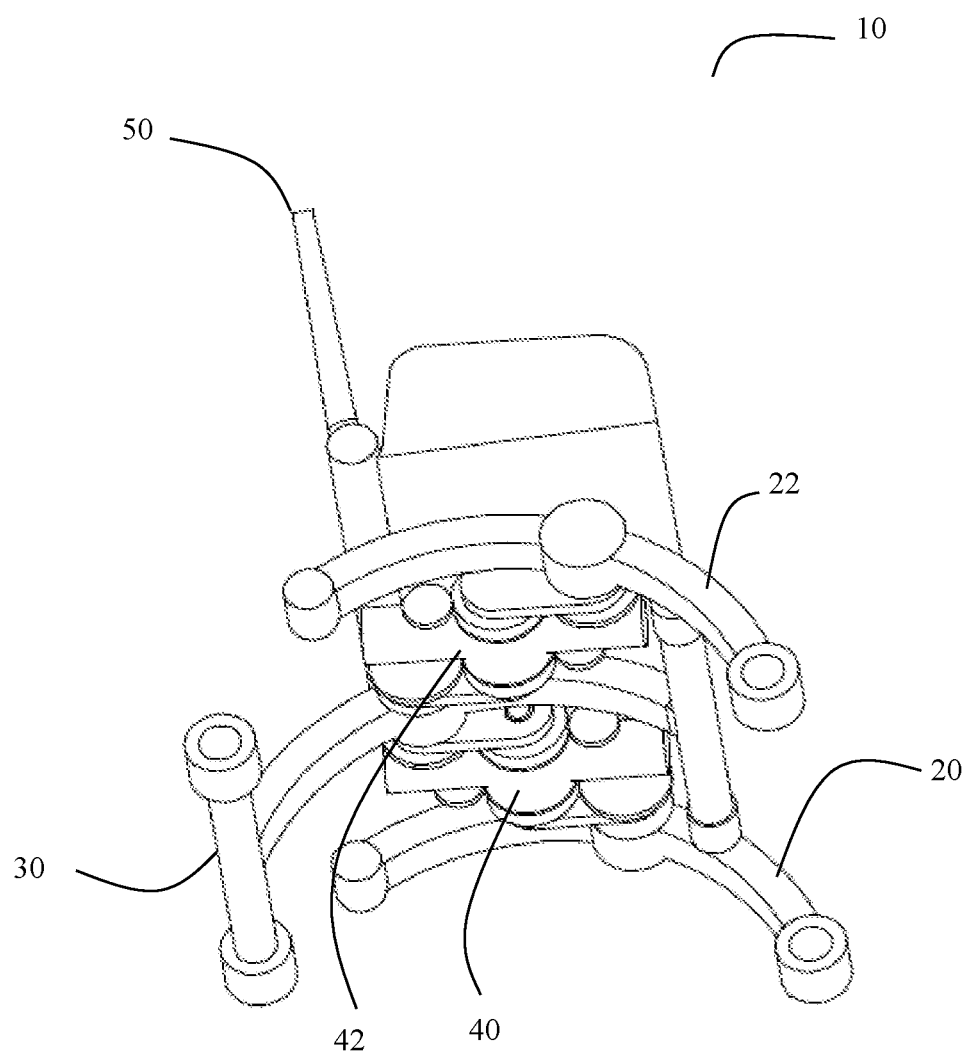
FIG. 2 is an underside perspective view of the wheelchair of FIG. 1.
Figure 3:
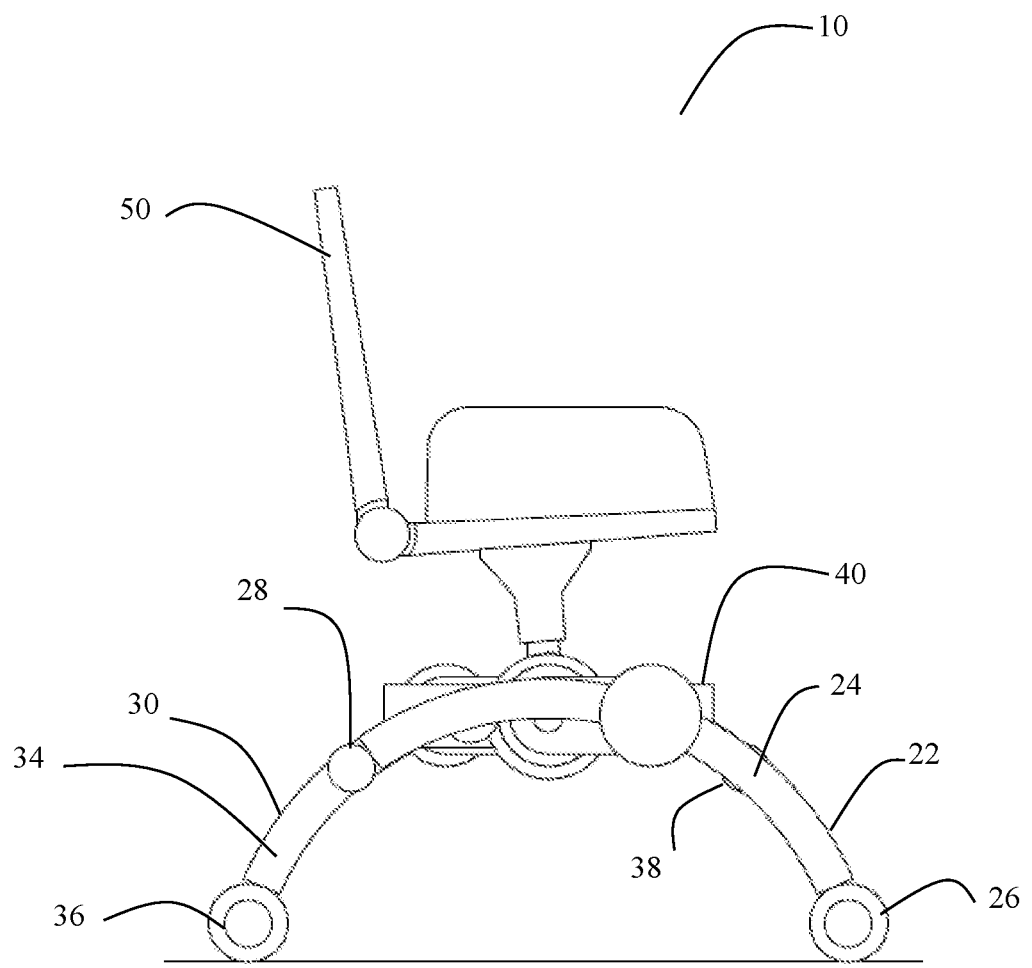
FIG. 3 is a side view of the wheelchair of FIG. 1.

Referring to FIGS. 1 to 3, a conveyance for surmounting obstacles is shown in the form of motorised wheelchair 10.

Wheelchair 10 includes a first ground engaging arrangement in the form of outer bogies 20, 22 and a second ground engaging arrangement in the form of inner bogie 30. The first and second ground engaging arrangements are operable to move in an alternating sequence of movements to enable the conveyance to surmount obstacles such as stairs as will be later described.

Wheelchair 10 further includes a seat 50 and a user control panel 52. The control panel includes a joystick and other controls to allow the wheelchair occupant to control the movements of the wheelchair. Seat 50 is mounted on a chassis by attaching to drive units 40, 42. Seat is attached to the chassis by way of an adjustable mechanism which allows the position seat 50 to be adjusted forwards or backwards with respect to the chassis to enable control over the centre of gravity of the combination of the wheelchair and the occupant.

As best seen in FIG. 3, outer bogie 22 includes a forwardly disposed portion in the form of a steerable driven wheel 26 and a rearwardly disposed portion in the form of passive wheel 28. Wheels 26, 28 are spaced apart from one another by being mounted at opposite ends of a curved beam 24. The curvature of the beam 24 defines an obstacle accommodating region below the beam located between the wheels 26, 28 which accommodates a portion of an obstacle being surmounted, such as a stair, as will become apparent.

Similarly, inner bogie 30 includes a forwardly disposed portion in the form of a pair of passive wheels 38 and a rearwardly disposed portion in the form of a pair of steerable driven wheels 36. Wheels 36, 38 are spaced apart from one another by being mounted on cross members attached at opposite ends of curved beam 34. The curvature of the beam 34 defines an obstacle accommodating region below the beam located between the wheels 36, 38 which accommodates a portion of an obstacle being surmounted.

Figure 4:
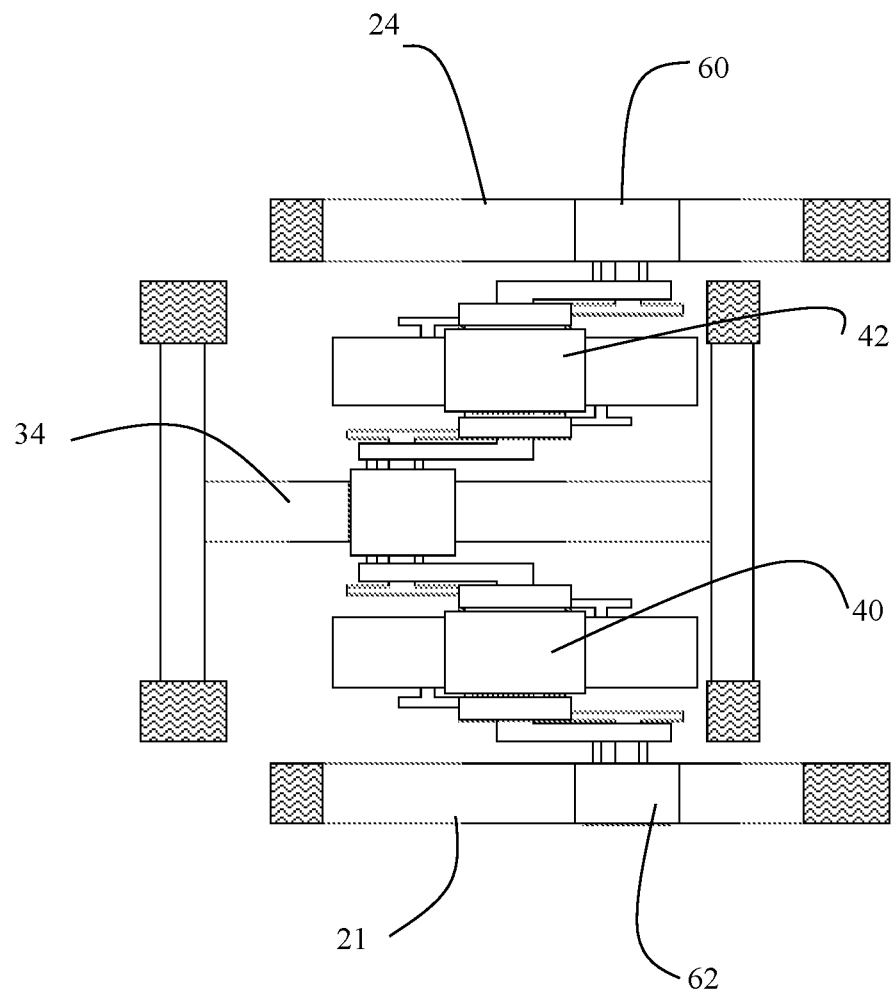
FIG. 4 is an underside view of the wheelchair of FIG. 1.

Referring now to FIG. 4, beam 24 is mounted to a carrier arm of drive unit 42 by way of epicyclic gearset 60. Similarly, beam 21 is mounted to a carrier arm of drive unit 40 by way of epicyclic gearset 62. Drive units 40, 42 both contain double pinion epicyclic gearsets. Each of the epicyclic gearsets is associated with two clutches to control operation of the gearsets as will be described. Suitable clutches include electromagnetic type clutches for robotic use as may be obtained from manufacturer Ogura Industrial Corp (www.ogura-clutch.com).

Figure 5:
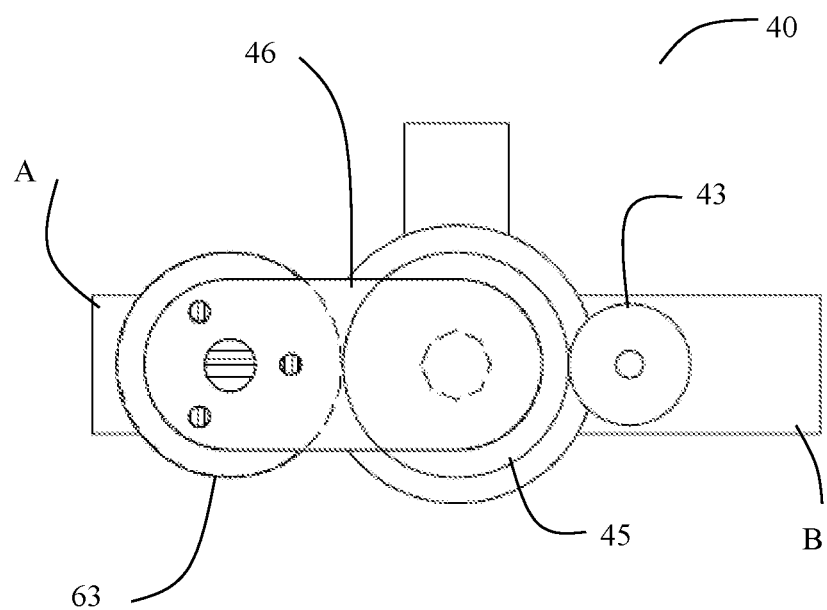
FIG. 5 is a detail view of one of the drive units of the wheelchair of FIG. 1.
Figure 6:
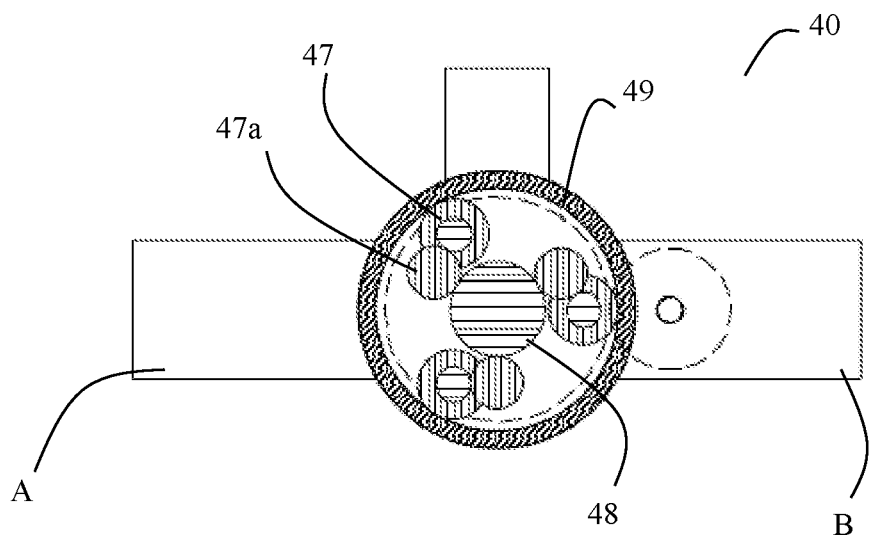
FIG. 6 is a cut away view of the drive unit of FIG. 5.
Figure 6A:
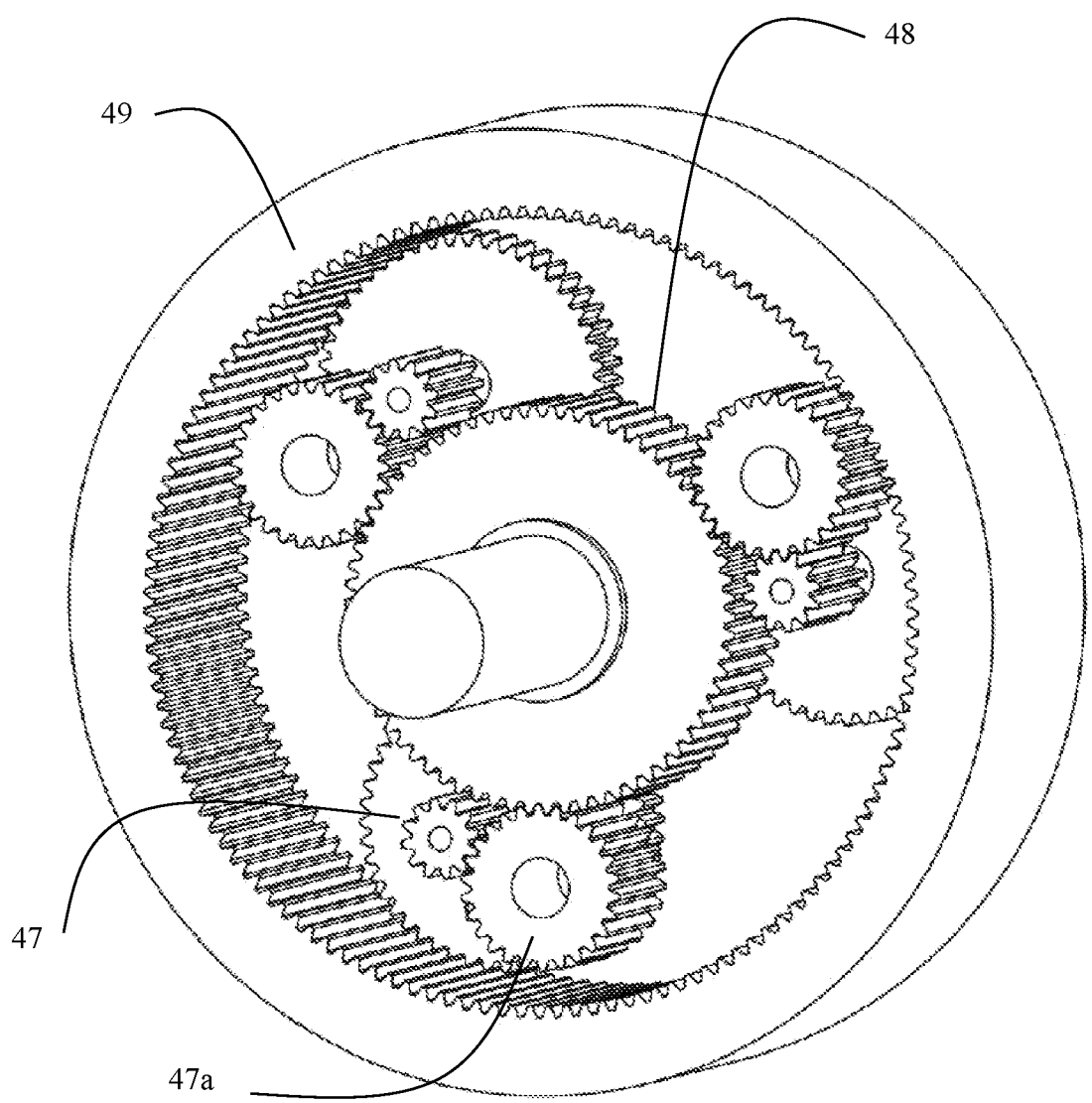
FIG. 6A is a perspective cut-away view of the epicyclic gear arrangement of the drive unit of FIG. 5.

Referring now to FIGS. 5, 6 and 6A, drive unit 40 includes a motor A and a motor B. Each motor includes an internal worm drive reduction gearbox which drives an output gear 43. The output gear 43 of motor B is visible in FIG. 5. Each output gear drives an associated main gear 45 which is free to rotate on the central axle of the double pinion epicyclic gearset. The axle of the double pinion epicyclic gearset is provided with teeth to form a sun gear 48. Ring gear 49 is affixed to the inside of the case of drive unit 40. Planets 47, 47a are mounted on a carrier which is selectively engageable with the main gear 45 by way of a clutch. Arm 46 is integrally formed with the sun gear 48. Arm 46 also carries a bogie gear 63 which is rotatably mounted to arm 46 and which meshes with main gear 45.

Figure 7:
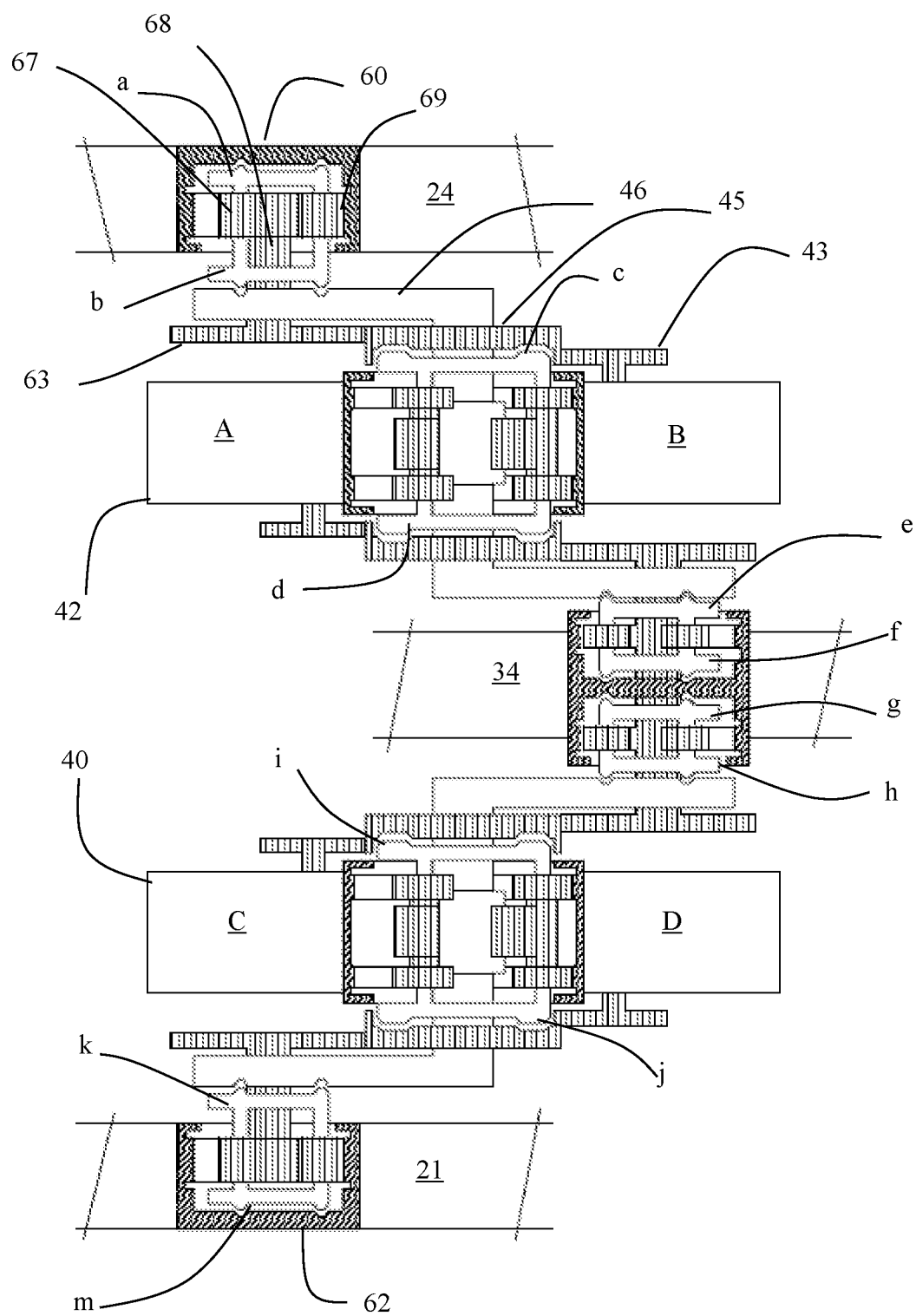
FIG. 7 is a schematic view of the chassis of the wheelchair of FIG. 1 with cut away views of the epicyclic gearsets.

Due to the double pinion nature of the gearset, the ring gear 49 and sun gear 48 rotate in opposite directions. Also, the double-pinion gearset is configured so that the ring gear 49 and the sun gear 48 rotate equally in opposite directions. That is to say, a reduction ratio of one to minus one. In this embodiment the gears of the double-pinion epicyclic gearset are configured as follows:

Main gear 45—has 130 teeth
Planet gear 47—is a compound gear including gears of 12 teeth and 48 teeth joined together on a common axis.
Planet gear 47a—has 26 teeth
Sun gear 48—has 66 teeth
Ring gear 49—has 132 teeth
Bogie gear 63—has 130 teeth Referring now to FIG. 7, the bogie gear 63 is integrally formed with the axle of epicyclic gearset 60 which is provided with teeth to form sun gear 68 of epicyclic gearset 60. Ring gear 69 is affixed to beam 24. Planets 67 are mounted on a carrier. The carrier can be rotationally fixed with respect to beam 24 by way of clutch a. This allows the wheelchair to be statically balanced on a bogie when it is engaged with the ground. The carrier can be rotationally fixed with respect to arm 46 by way of clutch b. This allows for adjustment of the pitch of a bogie, at a suitable output torque. In this embodiment epicyclic gearset is dimensioned to provide an effective reduction ratio of two to one between the ring gear 69 and the sun gear 68. The ratio aims to halve the rotational speed, to double the output torque. In this embodiment the gears of the epicyclic gearset 60 are configured as follows:

Planet gear 67—has 20 teeth
Sun gear 68—has 40 teeth
Ring gear 69—has 80 teeth

The epicyclic gearset 62 associated with beam 21 is of similar construction to epicyclic gearset 60. It is controlled by operation of clutches k and m. Drive unit 40 is of identical construction to drive unit 42. It includes motors C and D and clutches i and j. Beam 34 of the central bogie is associated with two epicyclic gearsets which are of similar construction to the epicyclic gearsets 60, 62. They are associated with operation of clutches e, f, g, and h. In some embodiments one of the epicyclic gearsets associated with beam 34 may be omitted.

Wheelchair 10 includes a lidar system which detects the presence, shape and location of obstacles in use and is used to control the movements of the wheelchair. Wheelchair 10 further includes an onboard power supply in the form of a rechargeable battery for operating the electronic and electrical components of the wheelchair. The electronic components include a computer based control system which is programmed to conduct sequences of movements of the wheelchair in response to user inputs. The electrical components include motors, clutches and steering devices.

Figure 8A:
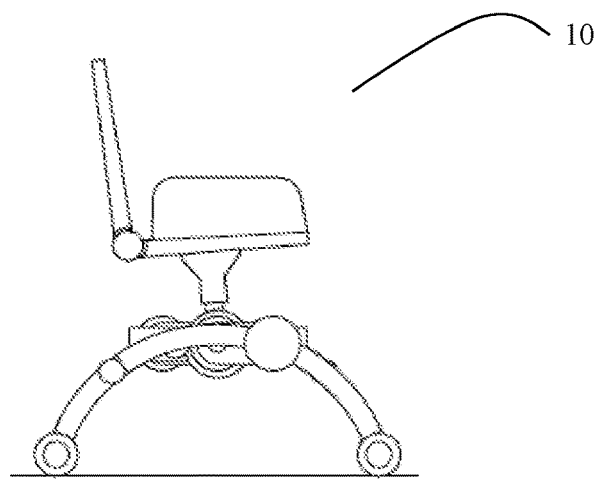
FIGS. 8a to 8c illustrate the wheelchair of FIG. 1 adjusted at different working heights.

Referring now to FIG. 8, height and footprint adjustment of the wheel chair will be described. At FIG. 8a, wheelchair 10 is shown in its default mid height configuration with default size footprint (the footprint being the area of the region defined by the ground contacting wheels). This configuration is used for normal travel along footpaths. To adjust the height and footprint of the wheelchair clutches b, e, h and k are engaged and all other clutches are disengaged. The motors B, D are operated together to turn in one direction and the motors A, C are operated together to turn in the opposite direction. This causes the mechanism to scissor upwards or downwards, depending upon the direction of rotation of the pairs of motors. Worm drives within the motors prevent slippage.

Figure 8B:
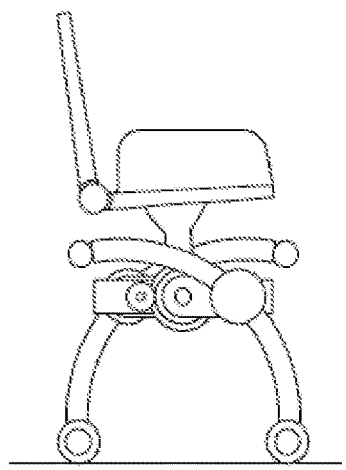
Figure 8C:
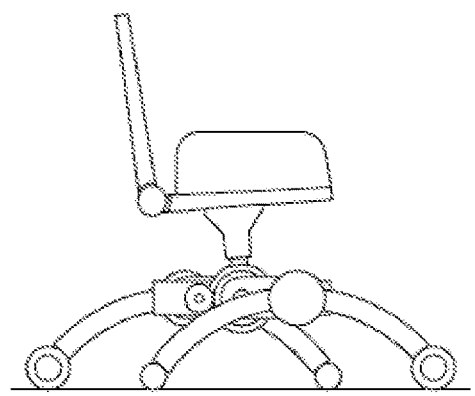

The scissor movement allows the wheelchair to move from the configuration shown in FIG. 8 to a high height configuration with a smaller footprint shown in FIG. 8b. This configuration is good for bars or retail counters and for negotiating narrow spaces such as turning a corner in a narrow corridor. Alternatively, the wheelchair can move to a low height configuration with a larger footprint as shown in FIG. 8c. This configuration is good for use with standard height desks. It is also the position that the wheelchair adopts at the commencement of a stair climbing operation.

Figure 9:
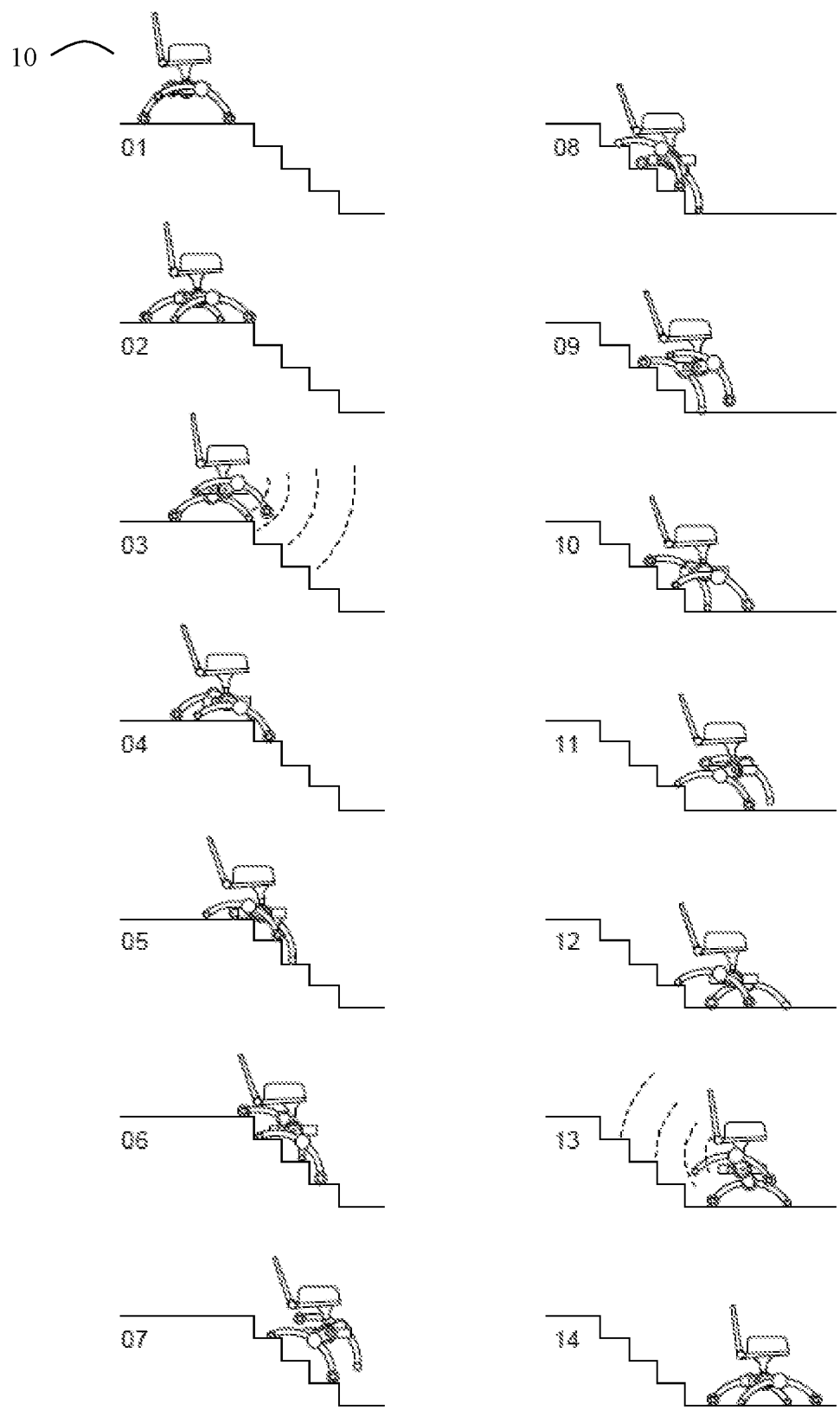
FIG. 9 shows a sequence of movements of the wheelchair of FIG. 1 descending a staircase.

Referring to FIG. 9, wheelchair 10 is shown in a sequence of steps which are used to carry out a stair climbing operation. The occupant of the wheelchair is not shown for ease of illustration. At step 01 the wheelchair 10 has arrived near the top of a staircase and the wheelchair occupant wishes to descend the stairs. The wheelchair occupant selects the relevant operation from the user control panel. This causes the onboard control system to conduct a sequence of movements.

The wheelchair firstly moves to the low configuration of FIG. 8c. The wheelchair then moves forwards until the lidar system indicates that the front wheels 26 are a predetermined distance away from the edge of the top stair as shown at step 02.

The outer bogies 20, 22 are then raised slightly off the ground. This is achieved by engaging clutches b, d, f, g, i and k and driving motors A and C. With the outer bogies off the ground, the attitude of the bogies can be adjusted by adjusting their pitch by driving motors B and D. Depending upon the direction of drive of motors B, D the pitch of the outer bogeys can be adjusted in either a clockwise or anti-clockwise direction. With the outer bogies lifted off the ground, the powered wheels 36 of the inner bogey are driven to move the wheelchair forwards until the lidar system indicates that the wheels 38 of the inner bogey are a predetermined distance away from the edge of the top stair as shown at step 03.

The outer bogies 20, 22 are then lowered by driving motors A, C, and their pitch adjusted by driving motors B, D until it is detected that wheels 26 have come into contact with the second stair and wheels 28 have come into contact with the top stair as shown at step 04. The top stair is accommodated within the region beneath the beam 24 and between the wheels 26, 28 of the outer bogies.

At all times when the outer bogies 20, 22 are lifted clear of the ground the wheelchair is statically balanced by the inner bogie 30. The centre of gravity of the combination of the wheelchair and occupant lies within the boundaries of the footprint defined by the pairs of wheels 36, 38 of the inner bogie.

The purpose of engaging clutches d and i during the lifting sequence, is to operate the double pinion epicyclic gearsets, which turn the drive units 40 and 42 in reverse to the rotation of the arm. This "neutralises" the rotation, keeping the drive units and the passenger seat level.

The clutches are now actuated in preparation for lifting the inner bogie 30. Clutches a, c, e, h, j and m are engaged, and the remaining clutches are released. Motors B, D now control the raising or lowering of the inner bogie 30 whilst motors A, C control the pitch of the inner bogie 30. The inner bogie 30 is lifted and the driven wheels 26 of the outer bogies are driven forwards until the lidar system indicates that wheels 26 are a predetermined distance away from the edge of the second stair.

Continued rotation of motors B, D causes the inner bogie 30 to "step over" the outer bogies 20, 22 and to lower the inner bogie 30 so that wheels 38 come into contact with the third stair, and wheels 36 come into contact with the top stair as shown at step 05. The top stair and the second stair are accommodated within the region beneath the beam 34 and between the wheels 36, 38 of the inner bogie.

Again, at all times when the inner bogie 30 is lifted clear of the ground the wheelchair is statically balanced by the outer bogies 20, 22. The centre of gravity of the combination of the wheelchair and occupant lies within the boundaries of the footprint defined by the pairs of wheels 26, 28 of the outer bogies.

Again, the double pinion epicyclic gearsets, turn the drive units 40 and 42 in reverse to the arms' rotation, to keep the drive units and the passenger seat level.

The wheelchair now continues a repeated sequence of movements in which the bogies operate alternately stepping one over the other to descend the staircase. As part of each stepping operation, the bogie that is in contact with the ground drives forward to the edge of the stair that it is resting upon. During steps 09 to 13 adjustments to the pitch of the bogies are made as the wheelchair progressively steps onto flat ground.

At step 14 the wheelchair has finished descending the stairs and is on flat ground in the lowered configuration of FIG. 8c. The wheelchair is then raised to the normal height configuration of FIG. 8a and the occupant can continue to travel on the flat ground in a usual manner.

During the stair descending operation the forward and rearward movement of the seat is controlled to move the occupant forwards or backwards to influence the location of the centre of gravity of the combination of the wheelchair and the occupant.

The operation of climbing a staircase is the reverse of the descent operation. The wheelchair occupant controls the wheelchair to bring the wheelchair up to the base of a staircase so that the back of the seat faces the stairs. The stair climbing operation can then be initiated and the wheelchair climbs the stairs backwards, with the occupant facing outwards.

Figure 10:
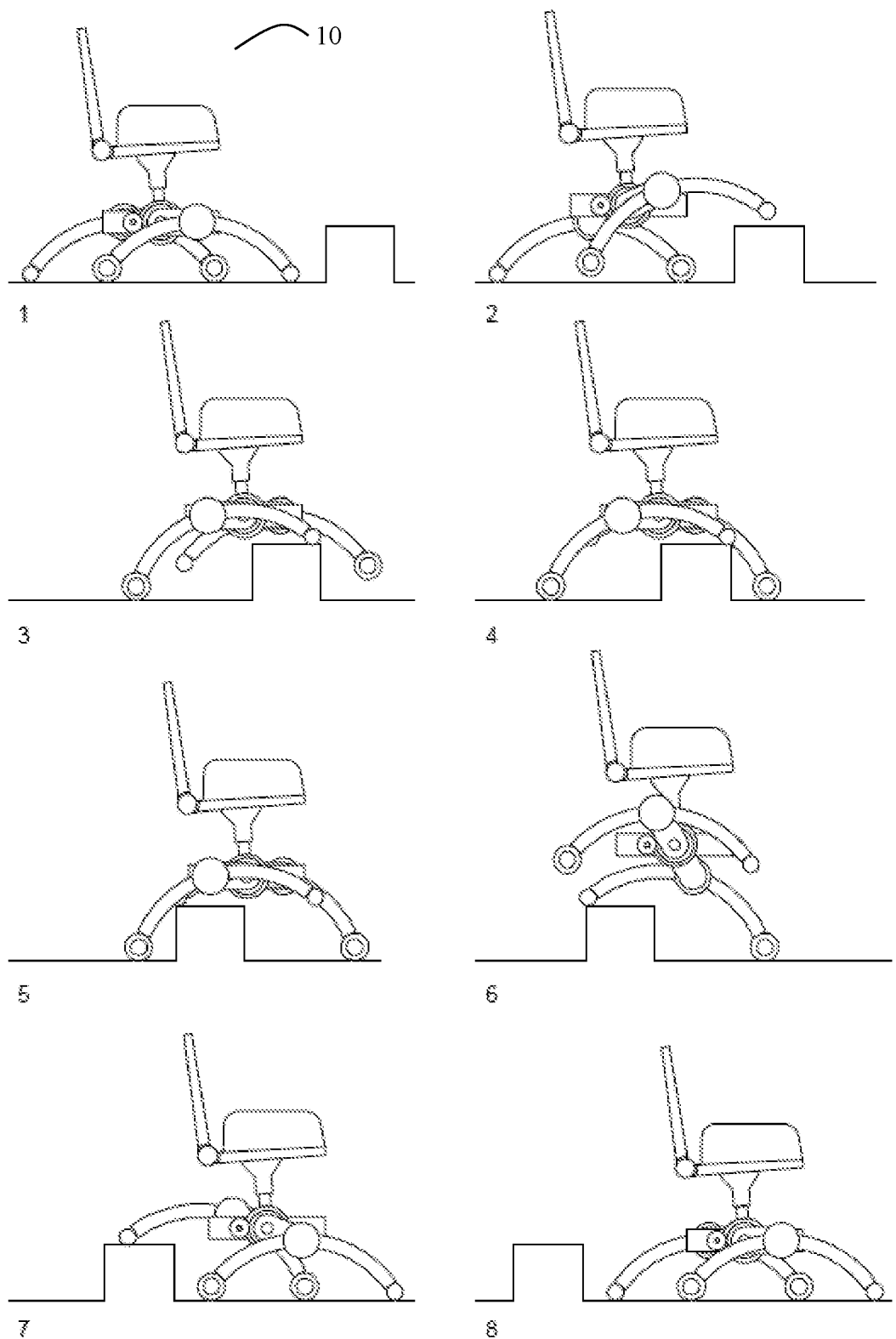
FIG. 10 shows a sequence of movements of the wheelchair of FIG. 1 stepping over a hob barrier.

Referring to FIG. 10, wheelchair 10 is shown in a sequence of movements surmounting an obstacle in the form of a hob barrier. The movements made are similar as for the stair climbing operation. The lidar system detects the shape and location of the hob barrier and the bogies are controlled in sequence to step over the obstacle.

Figure 11:
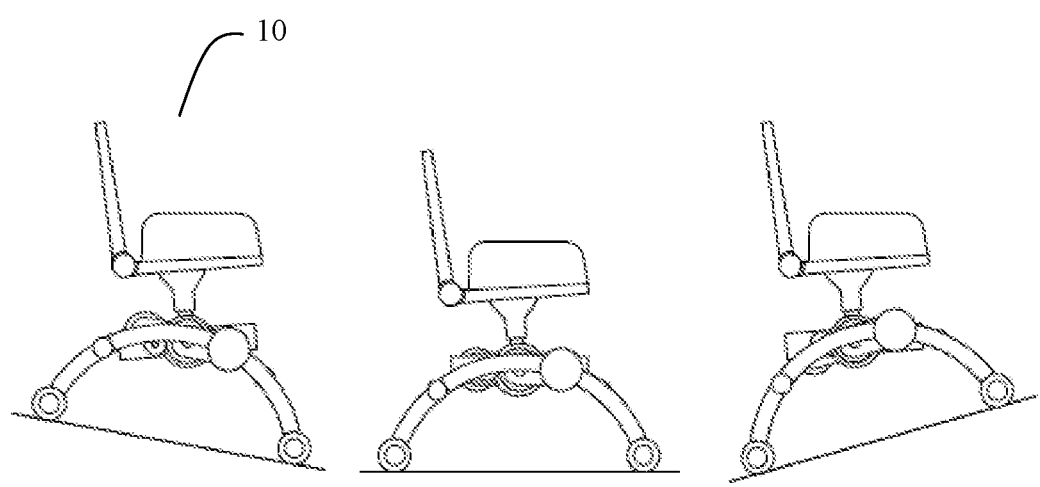
FIG. 11 shows a sequence of configurations illustrating a tilt adjustment function of the wheelchair of FIG. 1.

Referring to FIG. 11, wheelchair 10 is shown in a sequence of configurations to illustrate a tilt adjust function when travelling on sloping ground. With clutches a, b, e, f, g, h, k, m engaged and clutches c, d, i, j released then if all of motors A, B, C D are operated in the same direction this has the effect of adjusting the tilt of the seat of the wheelchair with respect to the wheels. The seat is tilted forwards or backwards depending upon the direction in which the motors are driven. This mode of adjustment compensates for travel on sloping ground and allows for the occupant of the wheelchair to remain sitting upright when travelling either uphill or downhill.

Figure 12:
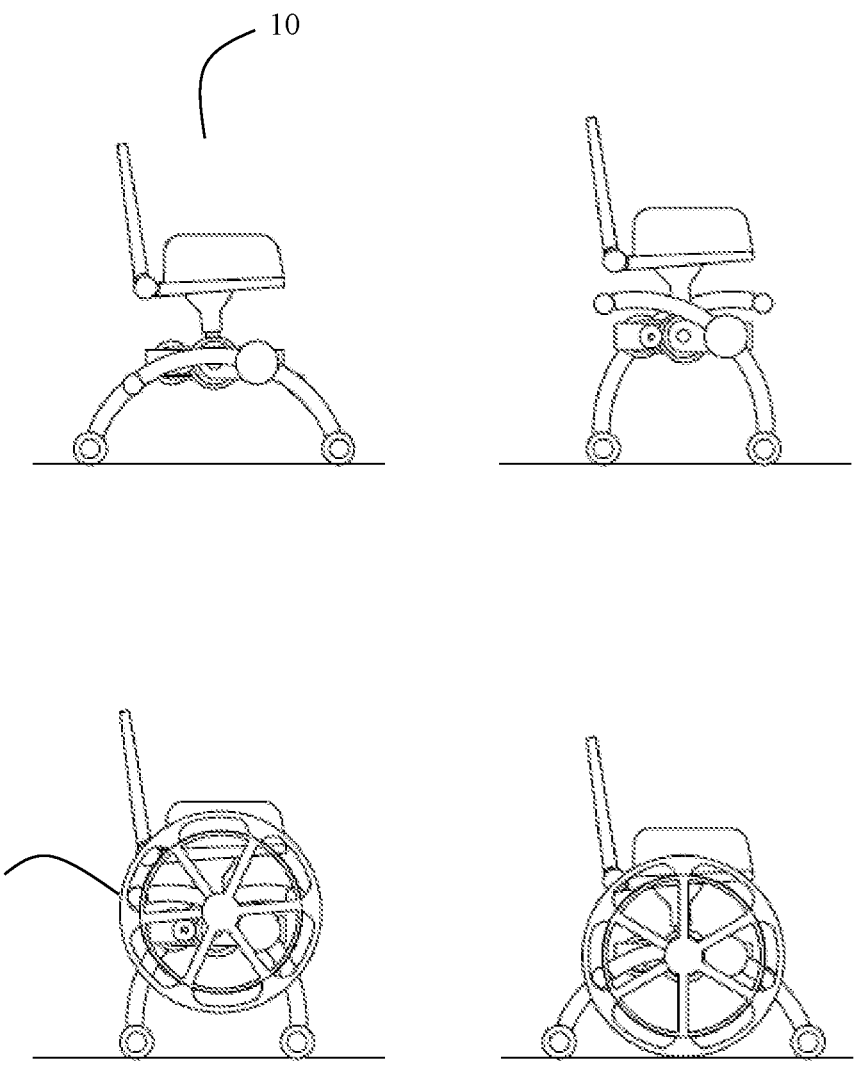
FIG. 12 is a sequence of views illustrating attaching a pair of manually propelled wheels to the wheelchair of FIG. 1.

Referring to FIG. 12, optionally, a pair of larger hand operable wheels 70 may be attached to the wheelchair to convert the wheelchair to a hybrid manual wheelchair. The wheelchair is first moved to the high configuration shown in FIG. 8b. Wheels 70 may then be attached to the outer bogies 20, 22. Wheelchair 10 is then lowered so that wheels 70 come into contact with the ground. The manually operable wheels allow the occupant to propel the wheelchair by hand to conserve battery life.

Figure 13:
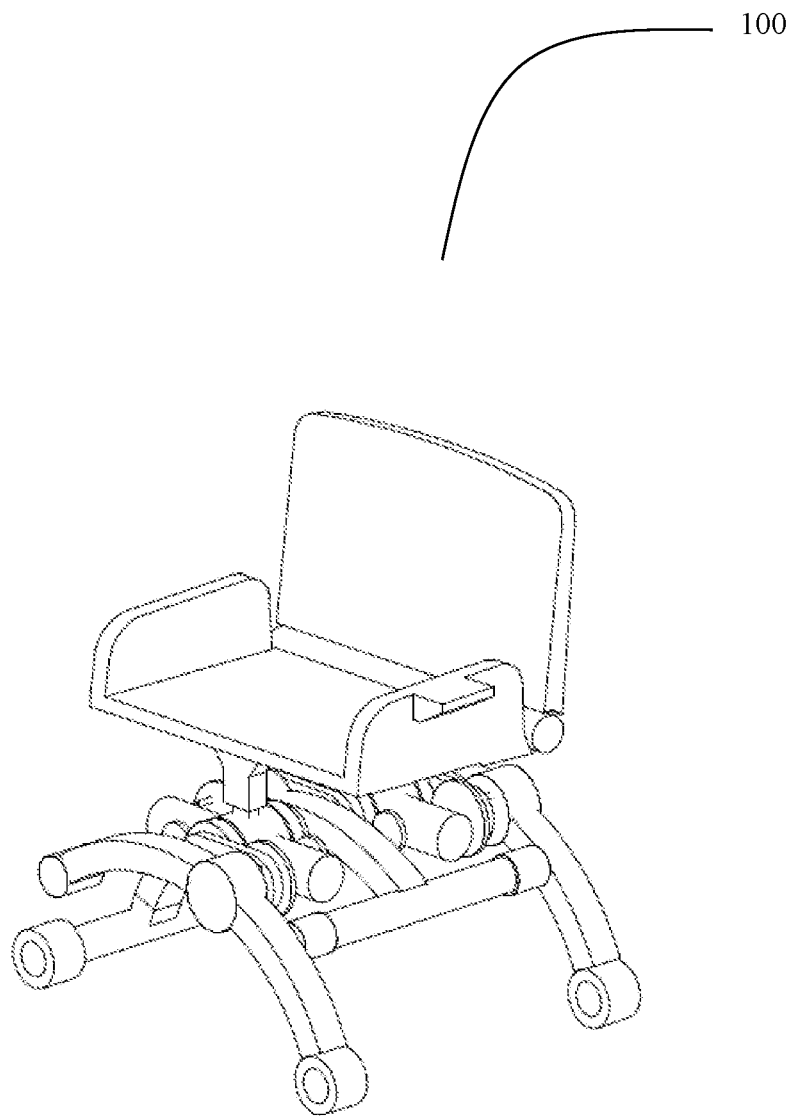
FIG. 13 is a perspective view of an alternative embodiment of a wheelchair with a swivelling seat.

Referring to FIG. 13, an alternative embodiment of a wheelchair 100 is shown. This embodiment differs from the embodiment described above in that the seat is pivotally mounted to the chassis. The user can swivel the seat to enable them to face sideways whilst ascending or descending a staircase or surmounting other types of obstacles.

Although the invention has been described with reference to a wheelchair, the invention has application in other types of conveyance. For instance, the conveyance could be designed to carry loads, rather than an occupant. The conveyance could be autonomously controlled to deliver goods or other items or to carry items around. The conveyance could be used in exploration over rough terrain. The conveyance could be used for mounting other equipment such as a robotic arm. An embodiment of the conveyance could, in a miniature form, be a toy.

In the embodiment described above a double pinion epicyclic gearset was associated with the chassis of the conveyance and a single pinion epicyclic gearset was associated with at least one of the ground engaging arrangements. In other embodiments a single pinion epicyclic gearset may be associated with the chassis of the conveyance. In such an embodiment an idler gear may be provided between the main gear and the bogey gear.

It can be seen that embodiments of the invention have at least one of the following advantages:

Whilst surmounting obstacles the conveyance remains statically balanced at all times by at least one of the ground engaging arrangements. This allows for very gentle, controlled movements to avoid damage to stairs and the like. It also allows the conveyance to stop moving at any time whilst also remaining stable and upright.
  The conveyance is able to maintain the stability of a load carried on the conveyance by controlling the orientation of the chassis.
  The conveyance is substantially symmetrical about a centre line parallel to the direction of travel of the conveyance. This contributes to balance and stability and may also reduce torsional stress.
  Wheelbase can fold to a compact four-wheel form when not deployed for surmounting obstacles. This improves agility, particularly in confined indoor spaces, so the conveyance can avoid hitting furniture and the like.
  Height adjustable to suit a range of different uses
  Tilt adjustable to compensate for travel on sloping ground.
  Aesthetically discreet. Is compact and has visual cues to everyday normal furniture. The feeling of familiarity improves social inclusivity for the user.
  May be converted to a hybrid manual wheelchair eliminating the need for two chairs and the inconvenience of moving between different chairs.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A conveyance for surmounting an obstacle including:
a first ground engaging arrangement;
a second ground engaging arrangement;
the first and second ground engaging arrangements being operable to move in an alternating sequence of movements to enable the conveyance to surmount the obstacle;
the conveyance being statically balanced alternately by one then the other of the ground engaging arrangements throughout the sequence of movements;
each ground engaging arrangement including a forwardly disposed portion and a rearwardly disposed portion which are spaced apart from one another; and
each ground engaging arrangement further includes an obstacle accommodating region, located between the forwardly disposed portion and the rearwardly disposed portion, which can accommodate a portion of the obstacle being surmounted during use;
wherein the ground engaging arrangements include wheels; and
at least some of the wheels are driven wheels;
the first and second ground engaging arrangements are joined to a rotating linkage which effects the alternating movement of the ground engaging arrangements;
the rotating linkage includes first and second pivotal joints provided at opposite ends of the linkage;
the first and second ground engaging arrangements are mounted to the first and second pivotal joints and the attitude of each of the ground engaging arrangements with respect to the rotating linkage is adjustable;
the rotating linkage rotates end-over-end, and each revolution of the linkage effects one alternating sequence of movements of the ground engaging arrangements; and
for each half rotation of the linkage one of the ground engaging arrangements moves ahead of the other, whereby the conveyance advances forwards by two steps for each complete revolution of the linkage.

2. The conveyance according to claim 1, wherein the forwardly disposed portion and the rearwardly disposed portion of at least one of the ground engaging arrangements are spaced apart from one another by being mounted at opposite ends of a beam.

3. The conveyance according to claim 2, wherein the beam is curved.

4. The conveyance according to claim 1, wherein the rotating linkage includes at least one epicyclic gearset.

5. The conveyance according to claim 1, wherein the rotating linkage includes at least one epicyclic gearset which is associated with a chassis of the conveyance and another epicyclic gearset which is associated with at least one of the ground engaging arrangements.

6. The conveyance according to claim 1, wherein at least some of the wheels are steerable wheels.

7. The conveyance according to claim 1, further including a seat to convey a person via the conveyance.

8. The conveyance according to claim 1, further including a pair of manually propelled wheels.

9. The conveyance according to claim 8, wherein the manually propelled wheels are removable.

10. The conveyance according to claim 1, which is controllable to adopt a range of different operating heights.

11. The conveyance according to claim 1, which is controllable to adopt a range of differently sized footprints.

12. The conveyance according to claim 1, which is adjustable to tilt to compensate for travel on sloping surface.

13. The conveyance according to claim 1, which is substantially symmetrical about a center line parallel to a direction of travel of the conveyance.

* * * * *